Jan. 28, 1964   L. C. NEWSOM   3,119,136
LAWN SWEEPER WITH TRASH-COMPRESSING ATTACHMENT
Filed July 12, 1962
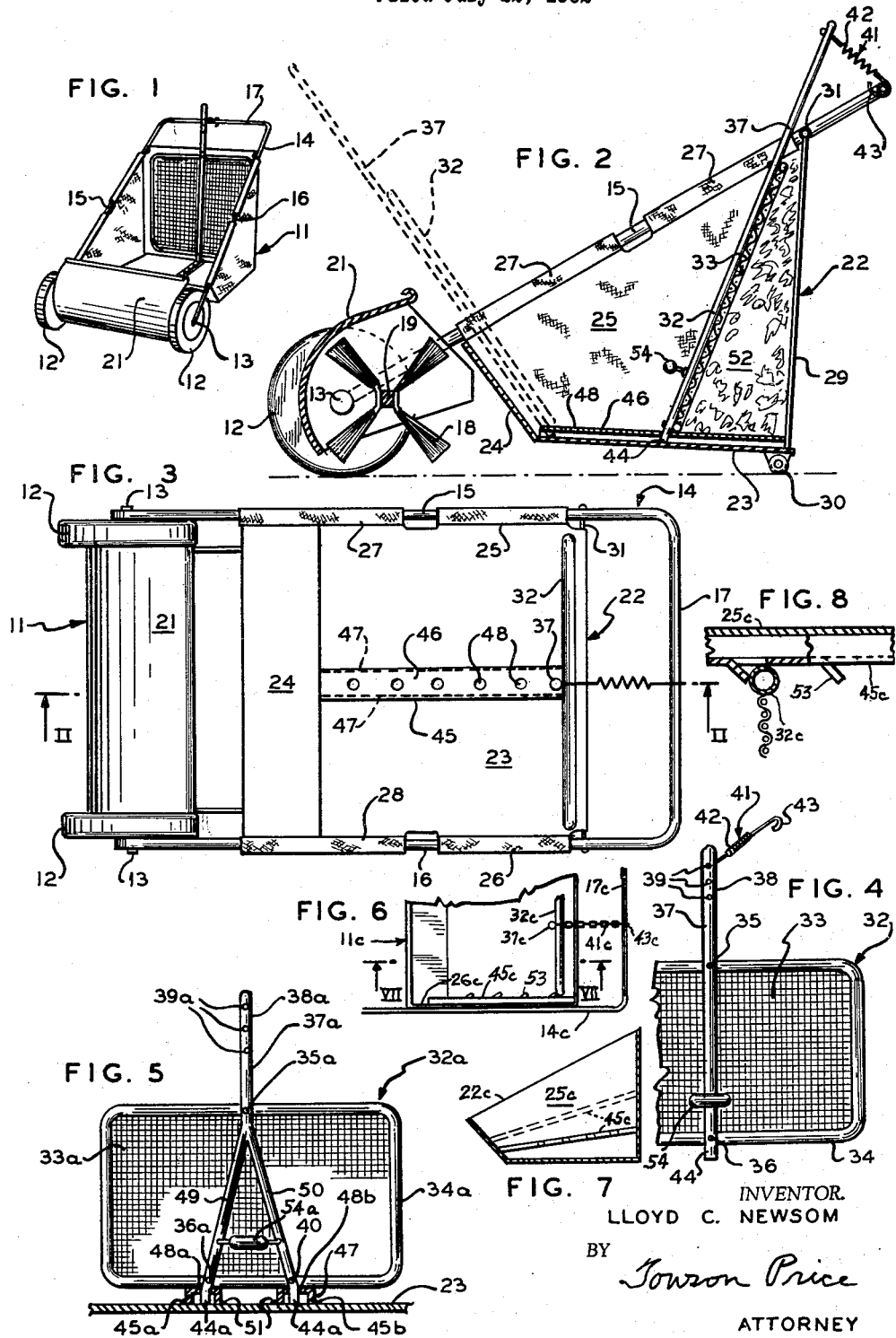
INVENTOR.
LLOYD C. NEWSOM
BY Towson Price
ATTORNEY

United States Patent Office 3,119,136
Patented Jan. 28, 1964

3,119,136
LAWN SWEEPER WITH TRASH-COMPRESSING
ATTACHMENT
Lloyd C. Newsom, 18 Hamilton Drive E.,
North Caldwell, N.J.
Filed July 12, 1962, Ser. No. 209,334
11 Claims. (Cl. 15—79)

This invention relates to lawn sweepers and, more particularly, to such of the type for removing leaves and other trash accumulated on a lawn.

A sweeper of the general type referred to above is provided with a trash receptacle or collecting basket disposed rearwardly, of the brush assembly of the device, in a position to receive leaves and other trash that are swept up. The receptacle desirably opens both upwardly and in a forward direction. It may be emptied from time to time when trash accumulates therein to an extent that adversely affects the adaptability of the device for depositing debris therein.

In the operation of a typical sweeper of the kind referred to above, I have found that the receptacle or trash basket tends, after becoming only partly full, to adversely affect the efficiency of the device for collecting additional leaves or the like. Under the circumstances indicated, leaves then begin to move in reverse through the rotary brush incorporated in the sweeper. In other words, the accumulation in the collecting basket, even when the basket is only about one-third full, is so deposited as to represent an obstruction to the movement of additional trash thereinto. Such additional trash, instead of moving freely into the basket, begins to clog or obstruct the path of movement of trash from the pick-up brush to the basket and such trash begins to fall back through the brush assembly.

In such an event the user may follow the practice of attempting to brush the leaves or the like back within the basket, away from the rotary brush assembly. However, even in such circumstances, the accumulation prevents efficient operation of the device and the basket must be emptied even though only partly filled. This is undesirable in that it represents an inconvenience and loss of time which it is planned to avoid by means of the present invention.

In accordance with the present invention, it is proposed to provide means for compressing leaves and other lawn trash in the collecting basket, which means is mounted within the basket and designed so as to enable the user to effect an accumulation of debris within the receptacle to an extent such that it is almost or entirely full, without interference with the proper operation of the sweeping brush.

It is also proposed to provide a leaf-compressing attachment which can be incorporated in lawn sweepers already in use without requiring extensive modification or redesign of such sweepers.

Still another object of my invention is to provide a lawn sweeper attachment of the character stated which will not in any way appreciably reduce the capacity of the trash receptacle.

A still further object of my invention is to form a leaf-compressing attachment which may be adjusted between operative and inoperative positions swiftly and easily.

An additional object of my invention is to provide a lawn sweeper attachment of the character described, which is capable of being manufactured and installed conveniently and at low cost.

These and other objects and advantages will become apparent from the following detailed description when taken with the accompanying drawings. It will be understood that the drawings are for purposes of illustration and do not define the scope or limits of the invention, reference being had for the latter purpose to the appended claims.

In the drawings, wherein like reference characters denote like parts in the several views:

FIGURE 1 is a perspective view of a lawn sweeper constructed in accordance with my invention.

FIGURE 2 is a vertical longitudinal sectional view to a larger scale of such a sweeper, on the line II—II of FIGURE 3, in the direction of the arrows.

FIGURE 3 is a plan of the sweeper of FIGURE 2.

FIGURE 4 is an elevational view of the compressing element or framed screen used with a sweeper embodying my invention.

FIGURE 5 is an elevational view corresponding to FIGURE 4, but showing a modified form and the means for holding the detents of said modified form in place with respect to the bottom wall of a trash receptacle.

FIGURE 6 is a fragmentary plan corresponding to FIGURE 3 but showing a modification.

FIGURE 7 is a fragmentary vertical longitudinal sectional view of the trash receptacle, on the line VII—VII of FIGURE 6.

FIGURE 8 is an enlarged fragmentary horizontal sectional view of the trash compressor and retainer of FIGURES 6 and 7.

Referring to the drawings in detail and first considering the embodiment of my invention illustrated in FIGURES 1 to 4, inclusive, there is shown a sweeper generally designated 11 and which may be of generally conventional form except for the addition of the trash compressor and the means for holding said compressor in place. Such a sweeper includes the usual transversely-spaced ground-engaging wheels 12 connected by an axle 13. A handle 14 for the sweeper includes transversely-spaced generally parallel side rails or elements 15 and 16 connected at their rear ends by a portion 17 which desirably extends generally parallel to the axle 13 and is to be gripped by the hands of the user during operation.

Since such a sweeper is generally known, it need not be described in detail except to disclose the basic construction and operation thereof. Thus the sweeper 11 has a rotary brush 18 comprising a plurality of outwardly-directed bristle tufts that are secured to a shaft 19 in a conventional manner, not fully indicated. Means such as gearing between the ground wheels 12 of the sweeper and the shaft 19 are provided to drive said shaft in a clockwise direction, as viewed in FIGURE 2. The sweeper further desirably provides an upwardly and rearwardly curving hood or deflector plate 21, disposed in front of and extended above the brush assembly 18. It is so arranged that when the sweeper is operated, the leaves swept by the brush will travel along the rear or inner surface of the plate 21 and be discharged rearwardly above the brush assembly and into the leaf basket or trash receptacle generally designated 22.

The basket or trash receptacle 22 is, in the present embodiment, suspended from the respective side rails 15 and 16. It includes a bottom wall 23 which may be formed of metal and have a forwardly and upwardly sloping portion forming a front wall 24. The receptacle 22 also includes side walls 25 and 26 which may be of canvas or other collapsible or flexible material. These side walls have hems 27 and 28, along their forwardly declining top edges, receiving the rails 15 and 16 respectively. The lower ends of these side walls are attached to adjacent sides of the bottom wall 23 and the sloping wall 24 for the support thereof.

A back wall 29, which may also be formed of material similar to that of the side walls 25 and 26, is connected at its lower end to the back edge of the nearly flat lower wall portion 23. Said back wall 29, at its top edge, is desirably hemmed to receive a transverse rear suspension bar 31. The bottom wall 23 is desirably provided with a support wheel or roller 30 rotatably carried therebeneath.

The trash compressor member 32 of my invention may be of varied construction. In the embodiment illustrated it comprises a screen 33, desirably of 1" wire mesh, with its peripheral or edge portion firmly secured, as by welding, to a frame member 34. The member 34 is desirably generally rectangular in shape but with rounded corners, as illustrated most clearly in FIGURE 4. This frame member is desirably formed of 1" aluminum tubing.

Secured to the frame member 34, as by means of rivets 35 and 36, is a lever 37 which may also be formed of 1" aluminum tubing. It is of such a length and so connected that an operating handle portion 38 projects above the top of the compressor 32 a suitable distance and is formed with one or more apertures 39 near its top end. The aperture 39 serves for receiving a hook or other connector to secure the connector means 41 for holding it to the handle portion 17 of the sweeper 11. This connector means 41 desirably takes the form of a coil spring 42, terminating at its free end in a hook 43 which may engage the sweeper handle portion 17 to urge the compressor 32 resiliently toward said handle portion, as viewed in FIGURES 1, 2 and 3. A light metal chain could be used instead of, or in addition to, the spring 42.

In order to hold or anchor the lower part of compressor 32 for a debris-compressing operation, the lever 37 has a lower portion 44 extending below the frame 34 to function as a detent. Such detent 44 holds the bottom of said frame in a selected position with respect to the lower wall 23 of the trash receptacle 22. For that purpose there is secured to the lower wall 23 of said trash receptacle a structural element 45 which extends longitudinally of and is secured to the top surface of said bottom wall by suitable means including welding, to function as detent-anchoring means. Although this element 45 may take one of various forms, it is here illustrated as a channel iron with a web 46 and flanges 47 depending on opposite sides thereof. The free edges of said flanges 47 are secured to the top surface of the bottom wall 23 of the receptacle.

By making the member 45 a channel, its web may be formed with a series of slots or apertures 48 to selectively receive the detent portion 44 for holding or anchoring the lower end portion of the compressor 32 at a selected distance from the rear wall 29 of the receptacle 22. The value of having the structural element 45 as a channel is that its web 46 is thus spaced above the top surface of the bottom wall 23, so that the compressor detent 44 may depend through a selected aperture 48 a substantial distance, to thereby firmly hold the lower end of said compressor in place.

Referring now to the embodiment of my invention illustrated in FIGURE 5, there is shown a trash compressor 32a as an alternate for the trash compressor 32 of the first embodiment. The compressor of the present embodiment desirably comprises a screen 33a of 1" wire mesh, with its periphery or edge portion firmly secured, as by welding, to a frame member 34a. As in the preceding embodiment, the member 34a is desirably generally rectangular in shape but with rounded corners. It is desirably formed of 1" aluminum tubing.

Secured to the frame member 34a, as by rivets 35a, 36a and 40 is a lever 37a which may also be formed of 1" aluminum tubing. It is of such a length and so connected that an operating handle portion 38a projects above the top of the compressor 32a a suitable distance and is formed with a plurality of apertures 39a near its top end. The apertures 39a serve for selectively receiving a hook or other connector to secure the means 41 for holding it to the handle portion 17 of the sweeper 11.

In the present embodiment, the lever 37a has its lower portion bifurcated, branched or inverted Y shape to provide a portion 49 flaring away from a portion 50 and each terminating in a detent portion 44a beneath the frame 34a. Such detent portions hold the bottom of the frame 34a in a selected position with respect to the lower wall 23 of the trash receptacle 22. For that purpose there is secured to the lower wall, in this embodiment, a pair of structural elements 45a and 45b, paralleling one another, extending longitudinally of, and secured to, the top surface of said bottom wall by suitable means including welding.

Although the elements 45a and 45b may take one of various forms, they are here illustrated as channel irons, each with a web and flanges depending on opposite sides thereof. The free edges of said flanges are secured to the top surface of the bottom wall 23 of the receptacle, as by welding indicated at 51. The reason for making the members 45a and 45b in the form of channels is the same as for making the member 45 in such form in the first embodiment. These channels 45a and 45b are each provided with a series of similarly spaced detent-receiving apertures 48a and 48b, like the apertures 48 of the preceding embodiment and for a similar purpose.

In making use of the compressor 32 or 32a with a sweeper 11 in accordance with my invention, the sweeper is first operated while the compressor lies flat against the rear wall 29, that is, when it is in the position of FIGURE 1, with the compressor detent or detents in the rearmost aperture 48, or the rearmost apertures 48a and 48b, as the case might be. The sweeping operation is continued until the level of the leaves or other trash reaches the top of the inclined portion 24, so that further operation would be interfered with because of the leaves tending to pile above said inclined portion.

The compressor 32 is then withdrawn from the rearmost aperture in the structural member 48 or members 48a and 48b, as the case may be, and moved to the position indicated by dotted lines 32 in FIGURE 2, to underlie the foremost edge of the pile of leaves and other trash. It is then slid rearwardly along the structural element or elements as far as possible, desirably with the detent means offset to a side of the anchoring means, until it is desired to have such means anchored, and inserted in the rearmost aperture therein which can be reached, with the trash between it and the rear wall of said receptacle. The compressor 32 is then swung clockwise and moved rearwardly from the position shown in dotted lines to that shown in full lines in FIGURE 2. The hook 43 of its connecting member 41 is then fastened over the handle portion 17 to resiliently hold the leaves and/or other trash 52 compressed in the rear portion of the receptacle as there viewed.

Although the detent 44 of the compressor 32 is shown fitted in the fourth aperture from the rear of the receptacle it might be one or the other apertures, depending on the compressibility of the trash 52 and the amount of that collected at the time this operation was performed. With the compressor 32 in the position illustrated in full lines in FIGURE 2, the trash collecting operation can be continued so that more trash collects in front of the compressor 32 until it again reaches the top of the inclined portion 24 of the receptacle.

The sweeper 11 would then be stopped, the movable retaining wall or compressor 32 or 32a removed, and again moved forward to the position illustrated in dotted lines. It would then be pushed rearward to compress all of the trash then collected and secure the detent portion in the rearmost aperture or apertures which could be reached for anchoring it in place. It would then again be swung clockwise to a position where the total trash collected would be compressed between it and the rear wall 29 of the receptacle.

After such a compressing operation, the compressor 32 or 32a might lie in the foremost aperture 48, or the foremost apertures 48a and 48b as the case might be, in the channel member or members at the bottom of the receptacle. That would then be all the compressing that would be done prior to an emptying of the trash and a repetition of the operation. However, in any event the aforedescribed operations would be continued until all trash that could be so compressed was handled in that way, thereby avoiding the necessity for frequent emptying of the receptacle before all possible trash was collected in the receptacle 22.

It will be understood that the advantage of the compressor 32 over that of FIGURE 5 is that it is cheaper and lighter. However, the compressor 32a has an advantage over that of FIGURE 4, in that it has two anchoring detents 44a spaced laterally from one another and respectively receivable in correspondingly spaced apertures 48a and 48b. This effects anchoring of the lower part of the compressor 32a against longitudinal shifting, and also against twisting about an upright axis, such as that of the lever 37 in FIGURE 4. The levers 37 and 37a may each have one aperture 39, as in FIGURE 4, or a plurality of apertures 39a, as in FIGURE 5.

Referring now to the embodiment of my invention illustrated in FIGURES 6, 7 and 8, there is shown portions of the handle 14c, the compressor 32c, and the trash receptacle or basket 22c of another sweeper 11c embodying my invention. Here, although the handle 14c and other parts of this sweeper may be like those of the sweeper 11, the basket 22c is desirably formed entirely of sheet metal. In any event, it is desirable that its side walls 25c and 26c be of metal, so that the here used anchoring means 45c may be secured to the inner surfaces of said side walls, like the members 45, 45a and 45b were secured to the upper or inner surfaces of the bottom walls of the baskets of the preceding embodiments.

These anchoring means 45c may be of various forms. They are here shown as of channel construction, with detents such as spring ratchet members or tongues 53 struck out from their webs. Their flanges are desirably secured to the adjacent inner surfaces of the side walls 25c and 26c, as by welding such as described in connection with the embodiment of FIGURE 5. They are positioned at a selected elevation, as illustrated in full or in dotted lines in FIGURE 7.

The compressor 32c of the present embodiment may be used like the compressors 32 and 32a of the preceding embodiments, except that it need have no bottom detent means. It is slid rearwardly against basket-collected trash until the side elements of the compressor frame successively depress one or more of the detents 53 on each side and are finally retained back of a selected pair of them, as represented in FIGURE 8. The hook 43c of its connecting member or chain 41c is then fastened over the handle portion 17c to hold the trash compressed in the rear portion of the receptacle, as previously described.

The compressor 32c may be constructed like that designated 32 or like that designated 32a. It, as well as the compressors of the preceding embodiments, may be provided with a handle 54 connected to its lever 37c by suitable means as illustrated in FIGURES 3 and 4, or with one 54a connected as illustrated in FIGURE 5. Although these compressors are illustrated as framed screens to which levers are secured, the screens may, if desired, be replaced by sheet metal framed by a peripheral flange or other reinforcement.

Having now described my invention in detail in accordance with the requirements of the patent statutes, those skilled in this art will have no difficulty in making changes and modifications in the individual parts or their relative assembly in order to meet specific requirements or conditions. Such changes and modifications may be made without departing from the scope and spirit of the invention, as set forth in the following claims.

I claim:

1. In combination with a lawn sweeper having trash pick-up means, a receptacle, with a front, rear, bottom and side walls, suspended from said sweeper and into which trash may be swept by said pick-up means, means for compressing such trash in the rear part of said receptacle, means extending longitudinally of, and secured to the top surface of said bottom wall and formed with a series of apertures disposed therealong, means on the compressing means for engagement with said longitudinally-extending means in a selected aperture to anchor said compressing means, and means attached to said compressing means and adapted to engage an upper portion of said sweeper to hold trash compressed between said compressing means and said receptacle.

2. In combination with a lawn sweeper as recited in claim 1, wherein said receptacle is suspended from said sweeper by its rear wall and side walls.

3. In combination with a lawn sweeper as recited in claim 1, wherein the means for compressing such trash comprises a screen framed by a tubular member.

4. In combination with a lawn sweeper as recited in claim 1, wherein the means with apertures to anchor said compressing means is a channel member with flanges extending downwardly from a web and secured to the upper surface of the bottom wall of said receptacle, and wherein the apertures are formed in said web.

5. In combination with a lawn sweeper as recited in claim 1, wherein the sweeper has a handle portion, and the means adapted to engage an upper portion of said sweeper comprises a hook secured by a spring to said compressing means and secured to said handle portion when said compressing means is in an operative position.

6. In combination with a lawn sweeper as recited in claim 1, wherein there is an actuating lever secured to said compressing means and having an operating handle portion projecting above and a detent portion projecting beneath said compressing means.

7. In combination with a lawn sweeper as recited in claim 6, wherein the lever handle portion projecting above said compressing means has a series of apertures to selectively receive one end portion of the means to hold the trash compressed between said compressing means and said receptacle.

8. In combination with a lawn sweeper having trash pick-up means, a handle portion formed as side members extended rearwardly therefrom and connected at their rear ends by a normally generally horizontal part to be manually gripped, a receptacle formed by a bottom wall, a rear wall and side walls suspended from the side members of said handle portion and into which trash may be swept, a framed screen for compressing such trash in the rear part of said receptacle, an actuating lever secured to said screen and having an operating handle portion projecting above and a detent portion projecting below said screen, a structural element extending longitudinally of, and secured to the top surface of said bottom wall, said element having a series of apertures disposed therealong to selectively receive said detent portion, and a hook secured by a coil spring to said lever handle portion and adapted to engage said generally horizontal sweeper handle portion.

9. In combination with a lawn sweeper having trash pick-up means, a handle portion formed as side members connected at their rear ends by a normally generally horizontal part to be manually gripped, a sweeper-carried receptacle with a bottom wall, and a rear wall into which trash may be swept by said pick-up means, a framed screen for compressing such trash in the rear part of said receptacle, an actuating lever secured to the frame of said screen and having an operating handle portion projecting above and a detent portion projecting below said frame, a structural element extending longitudinally of, and secured to the top surface of said bottom wall, said element having a series of apertures disposed therealong to selectively receive said detent portion, and a hook secured by a spring to said lever handle portion, and adapted to engage said generally horizontal sweeper handle portion, whereby the sweeper may be initially used with the framed screen disposed against the rear wall of the receptacle and, when a selected amount of trash has been accumulated in front of said screen, said screen may be removed and used to push back said trash against said rear wall and hold the trash there, with its detent inserted in a selected aperture in said structural element and its handle portion pulled back to compress said trash by said hook being engaged with said generally-horizontal sweeper handle part.

10. In combination with a lawn sweeper having trash pick-up means, a receptacle with walls, suspended from said sweeper and into which trash may be swept by said pick-up means, means for compressing said trash in the rear part of said receptacle, means extending longitudinally of, and secured to inner wall surface of said receptacle and formed with a series of anchoring means disposed therealong, means on said compressing means for engagement with a selected anchoring means to hold said compressing means, and means attached to said compressing means and adapted to engage an upper portion of said sweeper to hold trash compressed between said compressing means and said receptacle.

11. In combination with a lawn sweeper as recited in claim 10, wherein the means extending longitudinally of, and secured to inner wall surface comprises a channel member with flanges secured to said wall surface, and the anchoring means is resilient detent members projecting from the web of said channel for engagement with said compressing means.

References Cited in the file of this patent
UNITED STATES PATENTS

| | | |
|---|---|---|
| 2,517,335 | Muzzy | Aug. 1, 1950 |
| 2,614,380 | Gates | Oct. 21, 1952 |
| 2,984,850 | Law et al. | May 23, 1961 |